(12) United States Patent
Andoh et al.

(10) Patent No.: US 7,237,759 B2
(45) Date of Patent: Jul. 3, 2007

(54) AIR INTAKE CONTROL DEVICE FOR INTERNAL COMBUSTION ENGINE AND AIR INTAKE CONTROL DEVICE FOR GASOLINE ENGINE

(75) Inventors: Hitoshi Andoh, Hitachinaka (JP); Masahiko Soshino, Hitachiota (JP); Takahiro Shimura, Mito (JP); Kenjo Ono, Mito (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/689,598

(22) Filed: Oct. 22, 2003

(65) Prior Publication Data
US 2004/0079327 A1   Apr. 29, 2004

(30) Foreign Application Priority Data
Oct. 23, 2002   (JP)   ............... 2002-307783

(51) Int. Cl.
*F16K 1/226*   (2006.01)
(52) U.S. Cl. ................. 251/208; 251/305; 123/337
(58) Field of Classification Search ........ 251/305–308, 251/208; 123/337, 328, 339.11, 587
See application file for complete search history.

(56) References Cited

U.S. PATENT DOCUMENTS

| | | | |
|---|---|---|---|
| 5,582,148 A | | 12/1996 | Hashimoto et al. |
| 5,704,335 A | | 1/1998 | Akutagawa et al. |
| 5,992,377 A | * | 11/1999 | Dall'Osso et al. .......... 123/337 |
| 6,041,754 A | | 3/2000 | Mori et al. |
| 6,076,499 A | | 6/2000 | Klumpp |
| 6,186,115 B1 | | 2/2001 | Nishimura et al. |
| 6,505,643 B2 | * | 1/2003 | Scholten et al. ............ 137/554 |
| 2004/0000298 A1 | | 1/2004 | Shin |

FOREIGN PATENT DOCUMENTS

| | | |
|---|---|---|
| DE | 1 080 813 | 4/1960 |
| DE | 24 27 995 | 1/1976 |
| DE | 43 06 607 A1 | 8/1994 |
| EP | 0 109 792 B1 | 6/1987 |
| EP | 1 365 140 A2 | 11/2003 |
| JP | 58-202337 | 11/1983 |
| JP | 3-182643 A | 8/1991 |

(Continued)

OTHER PUBLICATIONS

European Search Report dated Nov. 10, 2006.

(Continued)

*Primary Examiner*—John Bastianelli
(74) *Attorney, Agent, or Firm*—Crowell & Moring LLP

(57) ABSTRACT

An air passage 2 is provided with an air passage groove 5 that supplies a required volume of air to the side downstream from the fully closed position of a valve body for control purposes. Further, a taper is formed in such a way that a predetermined volume of air can be supplied, even if positional variations have occurred to the valve body. This arrangement allows the volume of air required for the traveling of a car to be supplied, without increasing the number of parts, even if the valve body 3 has stuck downstream from the controlled area. This arrangement also permits a stable supply of air flow at the idle position of the valve body.

11 Claims, 6 Drawing Sheets

FOREIGN PATENT DOCUMENTS

| | | |
|---|---|---|
| JP | 03-271528 | 12/1991 |
| JP | 06-129935 | 5/1994 |
| JP | 06-137984 | 5/1994 |
| JP | 07-269375 | 10/1995 |
| JP | 07-269377 | 10/1995 |
| JP | 9-88640 A | 3/1997 |
| JP | 09-126325 | 5/1997 |
| JP | 9-195803 A | 7/1997 |
| JP | 10-103082 | 4/1998 |
| JP | 10-121992 A | 5/1998 |
| JP | 2807033 | 7/1998 |
| JP | 11-002170 | 1/1999 |
| JP | 11-193726 | 7/1999 |
| JP | 2000-018396 | 1/2000 |
| JP | 2000-110951 | 4/2000 |
| JP | 2002-221036 A | 8/2002 |

OTHER PUBLICATIONS

European Search Report dated Jun. 6, 2006 (Four (4) pages).
Japanese Office Action (Notice of Rejection) dated May 9, 2006 including English translation of pertinent portion (Eleven (11) pages).

* cited by examiner

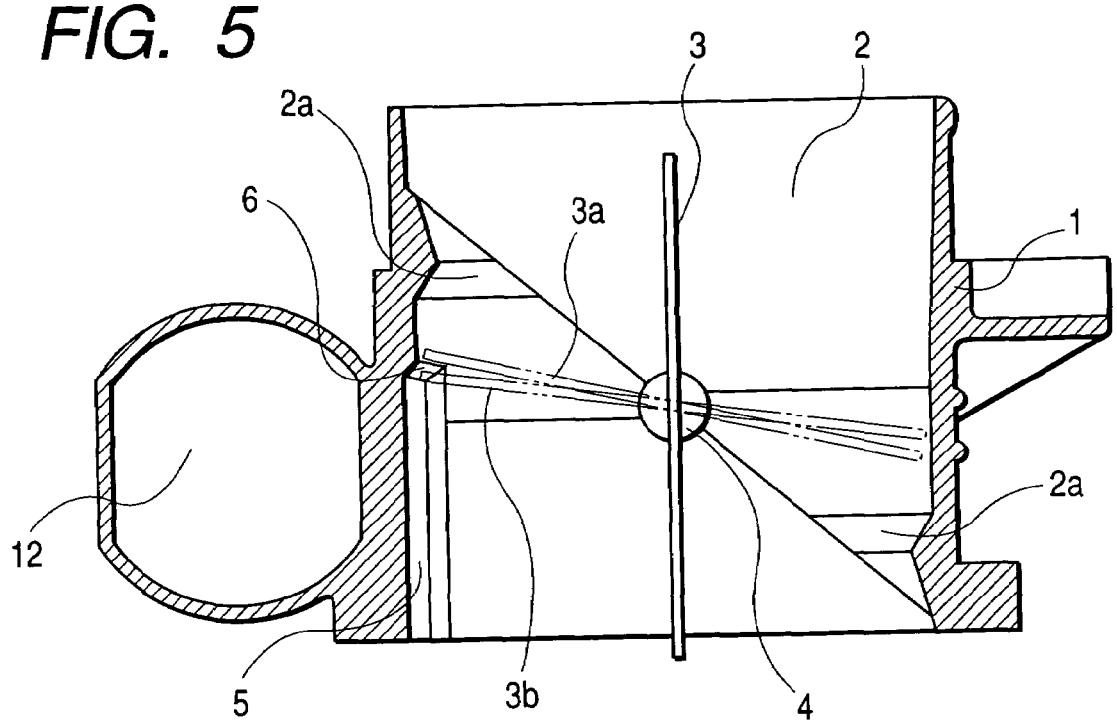
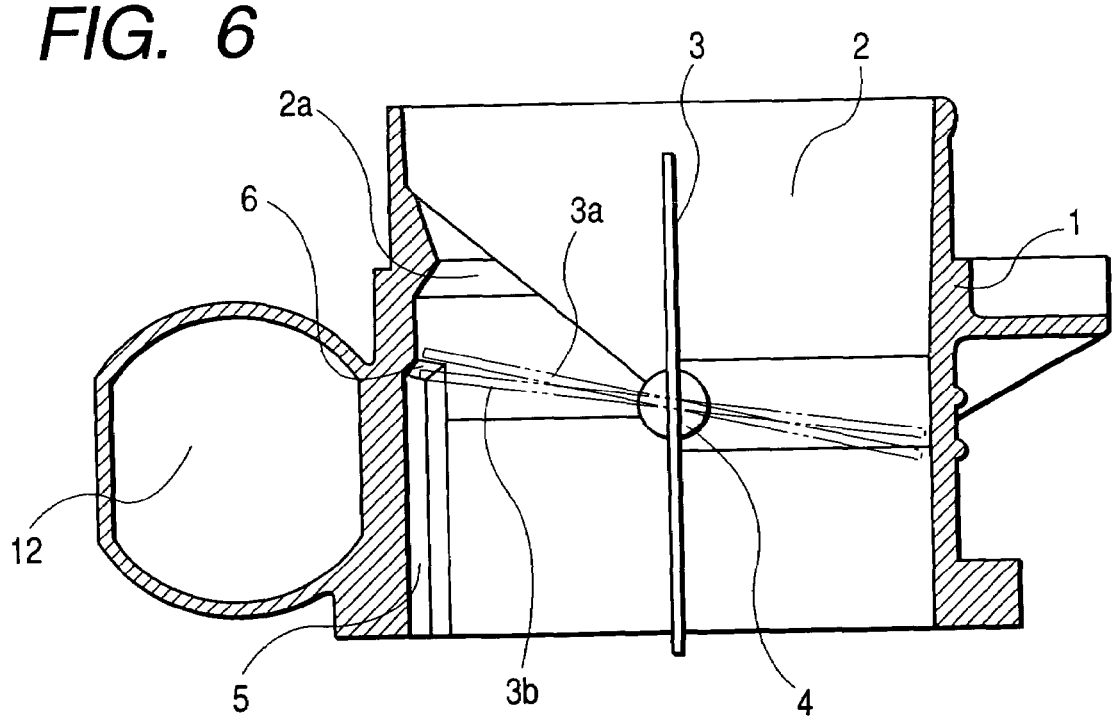

AIR INTAKE CONTROL DEVICE FOR INTERNAL COMBUSTION ENGINE AND AIR INTAKE CONTROL DEVICE FOR GASOLINE ENGINE

Air intake control device for internal combustion engine and air intake control device for gasoline engine

BACKGROUND OF THE INVENTION

The present invention relates to an air intake control device that controls the throttle valve provided halfway through the air intake passage of an internal combustion engine (e.g. a gasoline engine and diesel engine), thereby adjusting the opening area of the air intake passage in response to the operating status of an engine. This air intake control device is used to control the intake air volume in the case of a gasoline engine, and is employed as a throttle mechanism of the air intake passage in the case of a diesel engine. The above air intake control device is described in Japanese laid-open Patent Publication Hei 03-271528.

The air intake control device for the diesel engine is designed to provide control in such a way as to secure a position slightly more open than the mechanically fully closed position to ensure that a sufficient space can be maintained between the valve and air intake wall surface even when the valve body is fully closed. This ensures that the engine does not stall even if the valve should fail to operate at the fully closed position for control purposes.

In order to ensure that the a predetermined volume of air flow leaks when the motor current is turned off, a throttle device for gasoline engine uses a so-called default mechanism according to the Japanese laid-open Patent Publication Hei 03-271528, for example, wherein the springs that produce a return force in the direction opposite to each other are provided between the valve operating gear and air intake device, and a lever, not stuck on the rotary shaft, is utilized between these two springs, whereby the throttle valve is forcibly opened by a predetermined angle when the motor current is off.

SUMMARY OF THE INVENTION

In the case of an air intake device for diesel engine, a large gap is present even when the valve body is fully closed. This structure has made it impossible to control airflow in such a way as to reduce the airflow further.

To solve this problem, an invention intends to provide an air intake control device for diesel engine that can reduce the minimum air intake volume to a sufficiently small level when the air volume of the diesel engine is to be reduced even when the throttle valve failed to work at the air intake position (e.g. due to failure of the drive motor or sticking of the throttle valve), wherein the aforementioned air intake control device provides the flow of air required to start and operate the engine.

An electronically controlled throttle device for gasoline engine requires the aforementioned default mechanism, but this mechanism requires use of a great number of parts and complicated configuration, accompanied by difficulties in assembling.

Another invention intends to provide an electronically controlled throttle device for gasoline engine provided with a default mechanism of simple configuration. It is preferred to provide a mechanism that can be used by both a diesel engine and gasoline engine.

To achieve the aforementioned objects, a passage for bypassing the throttle valve when a throttle valve is located at the mechanically fully closed position (an endpoint of the throttle valve rotatable range on the opposite side of the range from the throttle valve-fully open position) is formed on the wall surface of the air intake pipe, and the position for minimum intake air volume for control purpose is formed at a position slightly opened than that position.

BRIEF DESCRIPTION OF DRAWINGS

FIG. 5 is another embodiment of FIG. 2;

FIG. 6 is a further embodiment of FIG. 2;

FIG. 12 is a characteristic diagram representing the intake air flow given in FIGS. 2 and 8 that can be coped with.

DETAILED DESCRIPTION OF THE PREFERRED EMBODIMENTS

The following describes the preferred embodiments of the present invention with reference to drawings. FIGS. 1 through 6 show an embodiment of a groove formed in the air passage of the throttle device for diesel engine according to the present invention.

Figure 1:
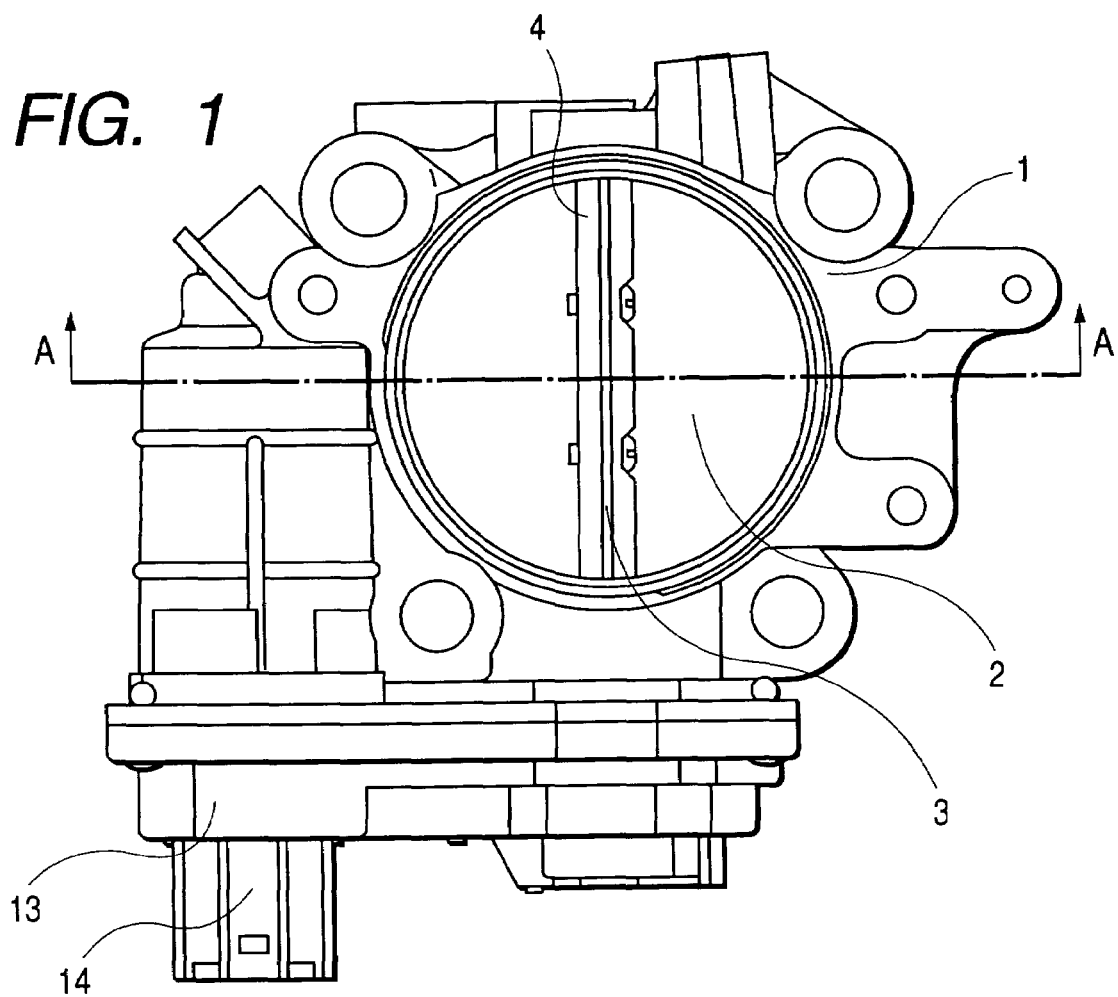
FIG. 1 is a plan view representing an embodiment of a throttle device for diesel engine according to the present invention.
Figure 2:
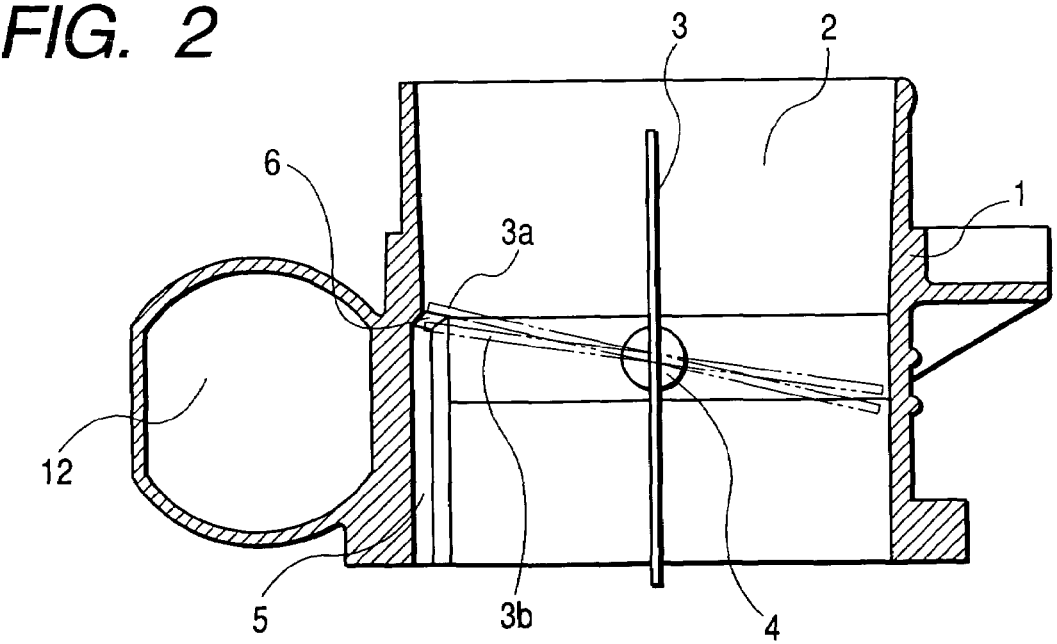
FIG. 2 is a cross sectional view of FIG. 1.

FIGS. 5 and 6 show another embodiment of the air intake passage other than that given in FIG. 2.

Figure 11:
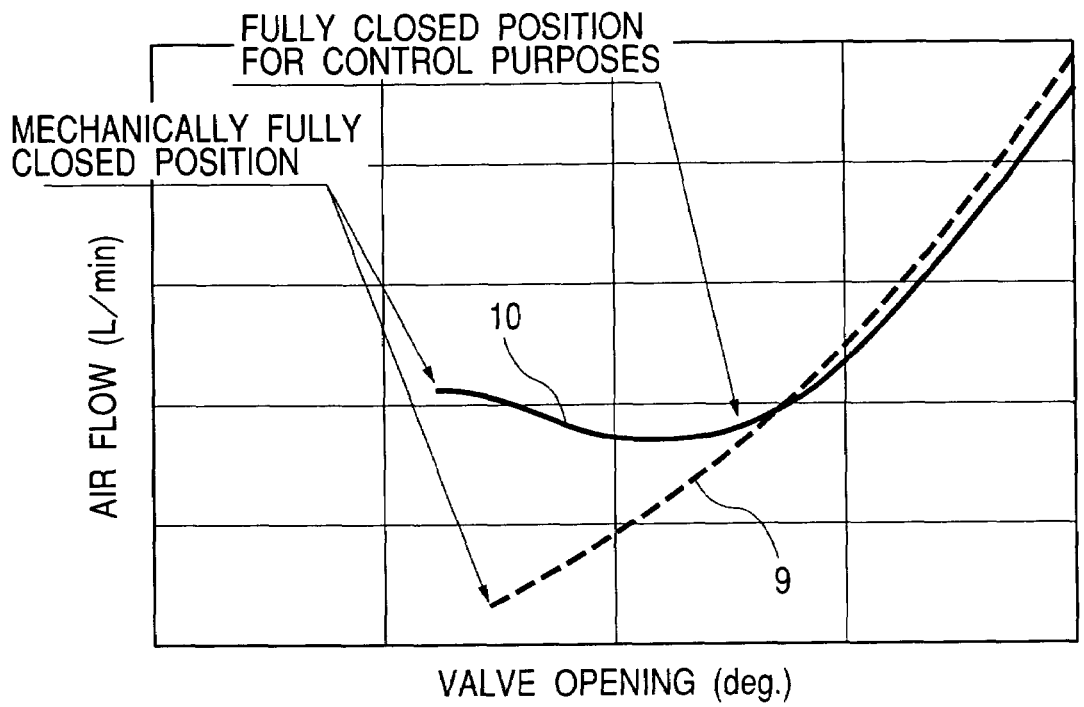
FIG. 11 is a characteristic diagram representing the air flow given in FIGS. 2 and 8.
Figure 12:
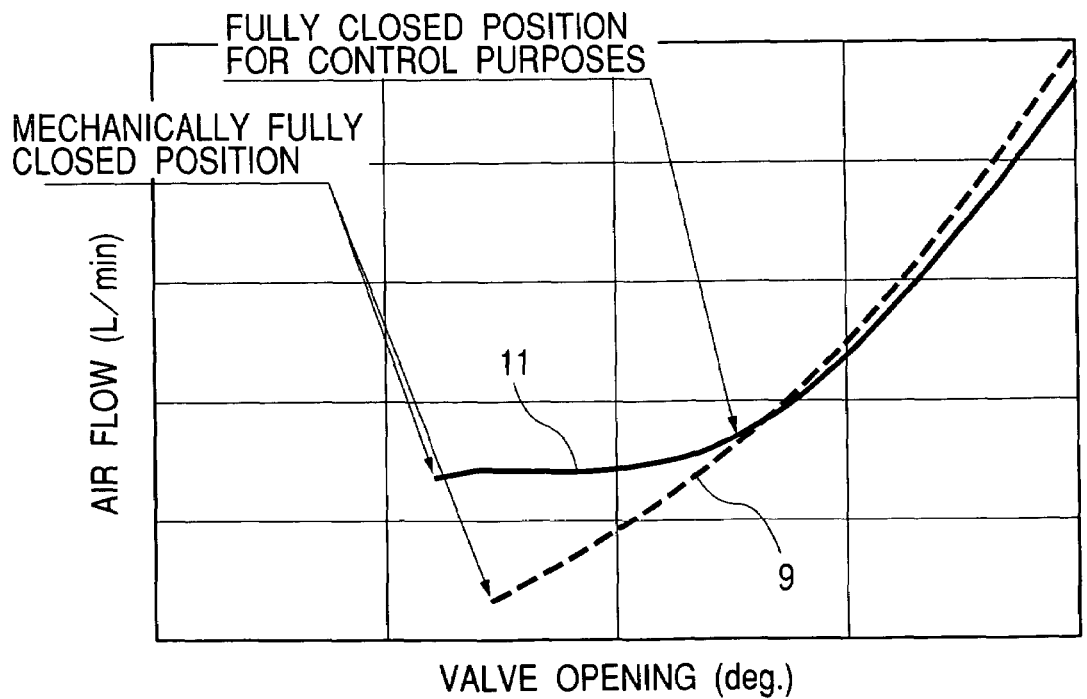

FIGS. 11 and 12 show the air flow characteristics in an embodiment of the present invention with respect to the air flow characteristics of a prior art product.

Figure 3:
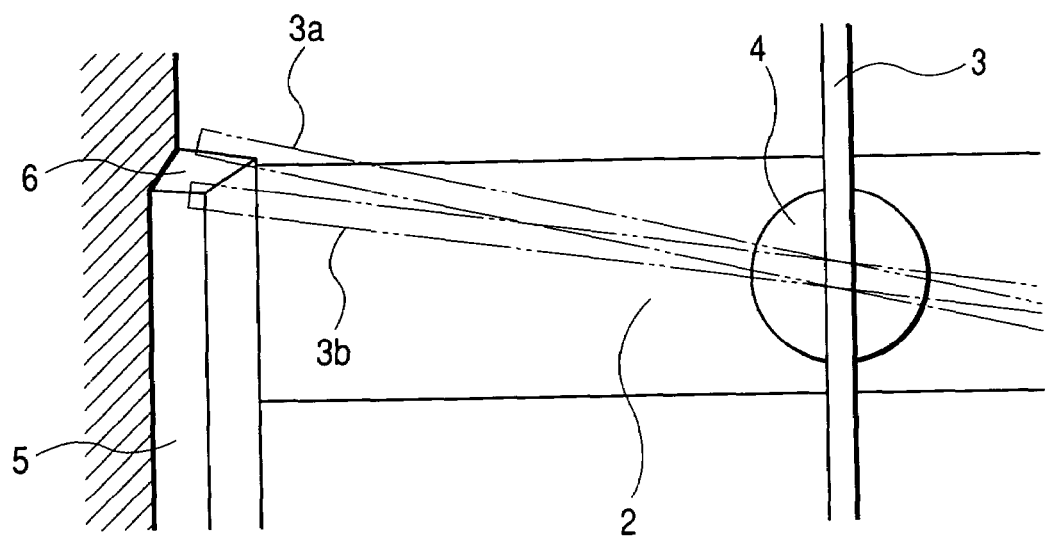
FIG. 3 is a diagram showing the details of the embodiment given in FIG. 2.

FIGS. 2 and 3 show the position of a valve body when this throttle device is mounted on the diesel engine for automobiles.

As shown in FIGS. 2 and 3, the air intake control device for reducing the volume of air intake in a diesel engine for automobile has a valve body 3 mounted on the rotary shaft 4 rotatably mounted on the throttle body 1.

A motor 12 is mounted on the throttle body 1, and a gear mechanism (not illustrated) and a sensor (not illustrated) for detecting the opening of the valve body 3 are installed inside a cover 13.

Signals from the ECU (engine control unit) (not illustrated) are captured from a connector 14 installed on the cover 13, and are transmitted to a motor 12. The valve body 3 is controlled by movement of the motor 12.

Information on the opening of the valve body is sent to the ECU from the connector 14. The ECU performs computation in such a way as to minimize the deviation between the signal from the sensor and the target opening required by the engine, and outputs the result of computation.

The valve body 3 is located at the fully open position during normal traveling. The valve body 3 operates when air supplied to a combustion chamber is cut off at the time of engine shutdown, when the flow of air is reduced for engine speed stability at the time of idling, and when negative pressure is produced to return exhaust gas to the upstream side of the combustion chamber.

When an instruction is given from the engine control unit to stop the aforementioned engine, the rotary shaft 4 is operated through the motor 12 for shutting off the sucked air, and the valve body 3 is controlled and set at the fully closed position 3a for control purposes.

In this case, the valve body 3 is controlled in such a way as to be located at a position slightly upward from the starting position of the air passage groove 5 formed in the inner wall of the air passage 2.

As shown in FIG. 11, the aforementioned steps provide the airflow characteristics 9 at the fully closed position, similarly to the case of a prior art throttle device.

Figure 10:
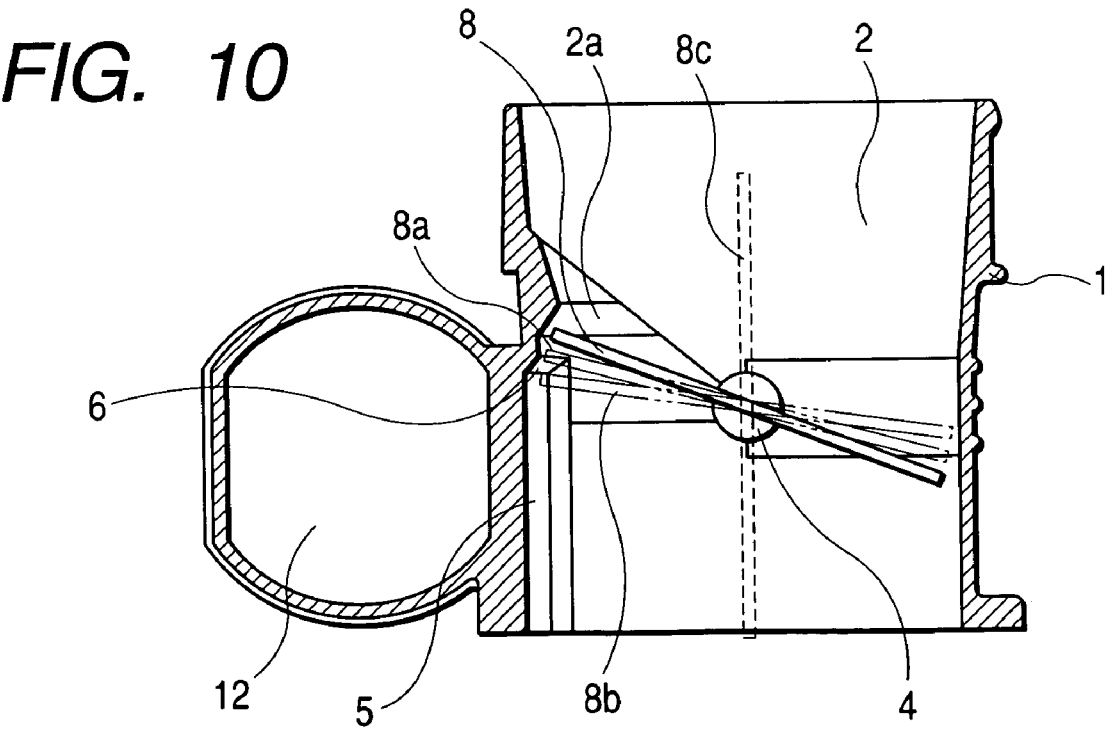
FIG. 10 is a still further embodiment of FIG. 8.

However, when the valve body 3 is stuck at a position (e.g. 3b) downstream of the fully closed position 3a for control purposes, air volume required for engine startup and operation cannot be supplied according to the prior art airflow characteristics 9. In the present embodiment, an air passage groove 5 is formed in such a way that the air flow at the mechanically fully closed position of valve body 3 is greater than that at the fully closed position for control purposes, as shown in FIGS. 10 or 11.

The aforementioned step makes it possible to supply a volume of air required for startup and operation even when the valve body 3 fails to operate at the mechanically fully closed position.

Figure 4:
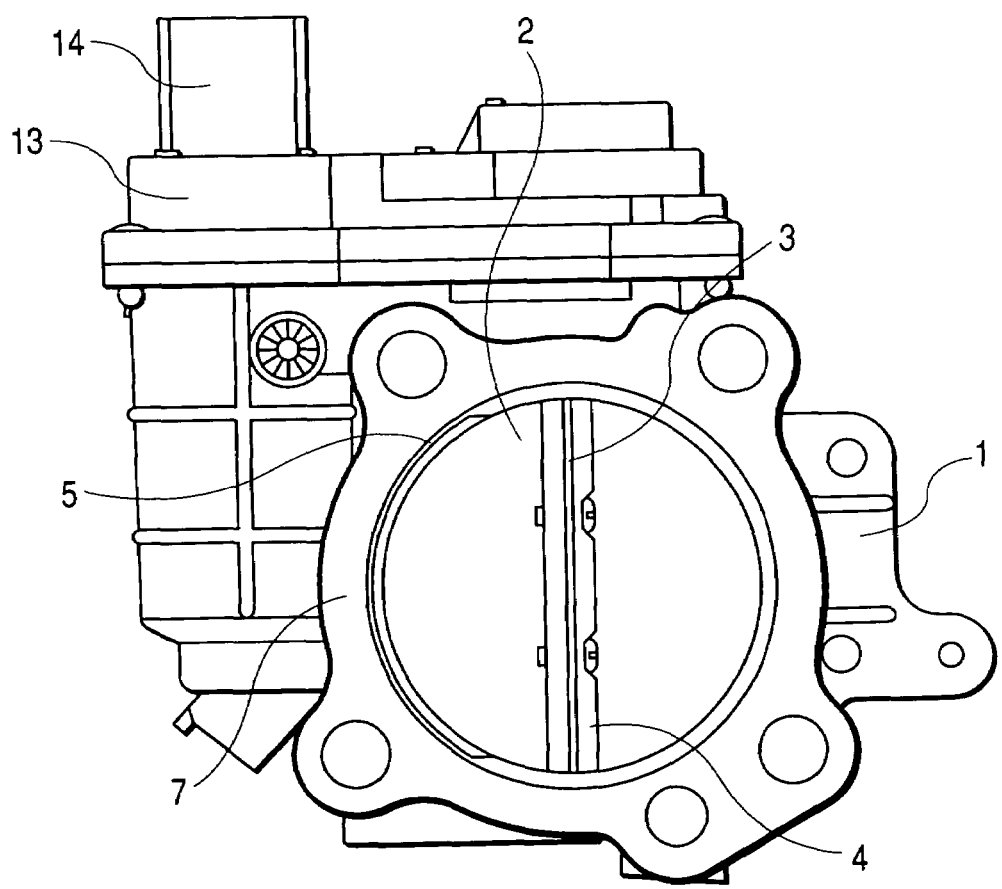
FIG. 4 is a diagram where the air passage groove of FIG. 1 is viewed from the downstream side.

By changing the area, profile, number and position of openings of the air passage groove 5 shown in FIG. 4 as required, it is possible to achieve various objects other than when the valve body 3 has stuck; for example, it is possible to reduce the hissing sound when the valve body 3 is closed, or to protect the valve body 3 against abrupt pressure change in the air passage 2. It is also possible to set the airflow characteristics at a desired value near the fully closed position for control purposes. Thus, this method has the advantage of design such a configuration that the airflow is increased gradually downstream from the fully closed position for control purposes of the valve body 3, as shown in FIG. 11.

Further, to improve the exhaust gas component controllability and operatively in the idling mode, the inlet taper 6 area of the air passage groove 5 is adjusted to the area of the opening in the position where the valve body 3 is idle. This adjustment provides the airflow characteristic 11 as shown in FIG. 12. This has the advantage of accommodating the variations among parts as well as variations in the control of the valve body.

Air flow can be kept constant or near constant at the valve opening within the range of the spherical surface, by forming the air passage 2 partly in a spherical form, as shown in FIGS. 5 and 6, rather than forming it in a straight form.

If the partially spherical form is adopted, there is an advantage that the valve body 3 scrapes off the sludge (contamination) deposited on the side of the engine of the valve body 3 when the valve body 3 is opened, thereby preventing sticking from occurring between the valve body 3 and air passage.

Figure 7:
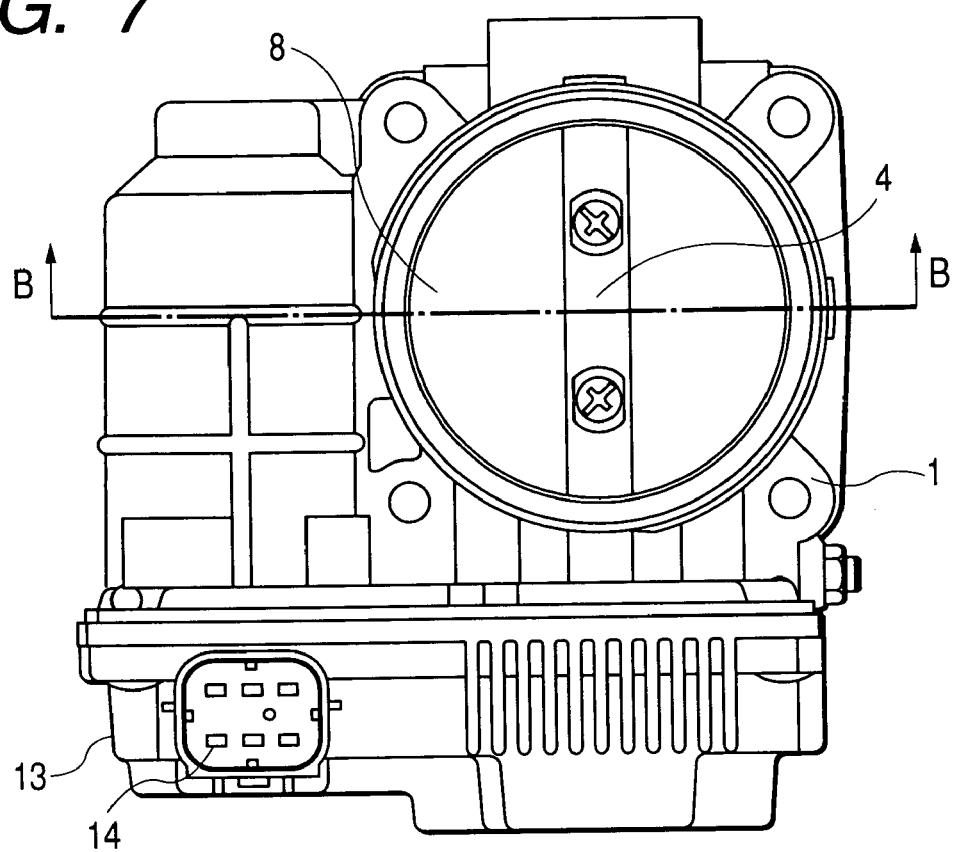
FIG. 7 is a plan representing an embodiment of a throttle device for gasoline engine according to the present invention.
Figure 8:
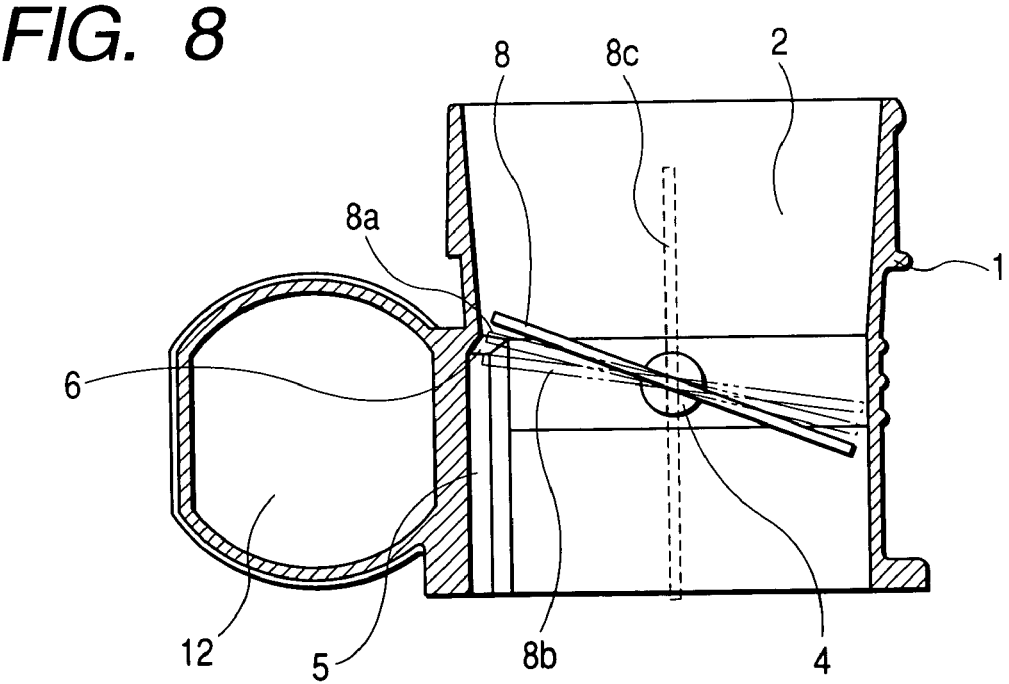
FIG. 8 is a cross sectional view of FIG. 7.

The following describes the embodiment of a throttle device (air intake control device) for gasoline engine with reference to FIGS. 7 through 10. FIG. 7 is a plan view representing an example of the groove formed in the air passage in the throttle device for gasoline engine in the present embodiment. FIG. 8 is a cross sectional view of FIG. 7.

Figure 9:
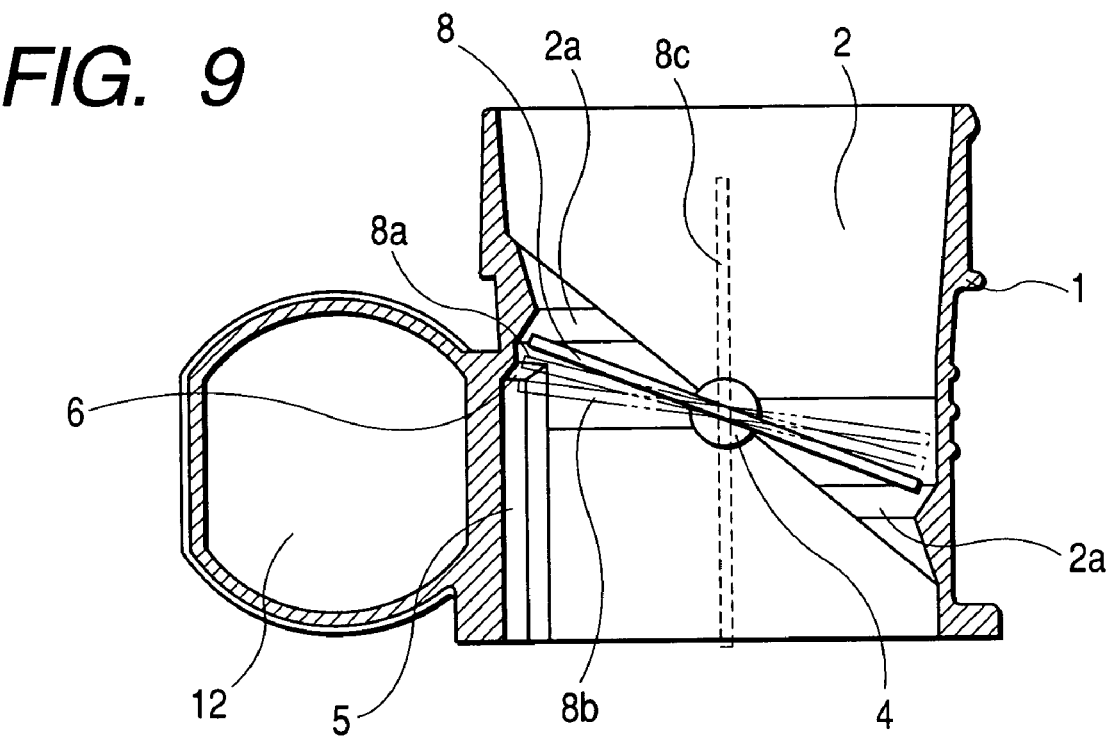
FIG. 9 is a still further embodiment of FIG. 8.

FIGS. 9 and 10 show other embodiments of the intake air passage given in other than FIG. 8. In this embodiment the air intake control device mounted on the gasoline engine uses a motor to drive the throttle valve. The following describes the operations when the present invention is applied to the aforementioned device:

When there is no instruction for motor drive from the engine control unit (no current supply to the motor), the throttle valve (valve body 8) is set at the default position of opening (intermediate angle of opening) by the action of the return spring, that is at the mechanically fully closed position 8b.

Control is provided in such a way as to secure a slightly more open position in order to ensure that the valve is located at the fully closed position 8a for control purposes in the idle mode. In the full-load running mode where the accelerator is fully pressed, control is made to get the fully open position 8c of the valve body 3 for control purposes.

In the air intake control device of the present embodiment, the opening of the valve body 8 is normally controlled in the range from the fully closed position 8a for control to the fully open position 8c for control, thereby getting the rising portion of the air flow characteristic 10 given in FIG. 11. The volume of intake air in the normal traveling mode is controlled in this manner.

To get a correct understanding of the position of the valve body 8, the valve body is energized mechanically by the return spring when the engine has started or stopped, to ensure that the valve body 8 is set at the mechanically fully closed position 8b. The valve opening sensor output value at this time is memorized by the engine control unit.

When the valve body 8 becomes stuck between the fully closed position 8a for valve body control 8a and mechanically fully closed position 8b of the valve body, the volume of air required for the engine startup and vehicle traveling can not be supplied, according to the air flow characteristics 9.

In the present embodiment, the flow of air in the mechanically fully closed position 8b of the valve body 8 is increased over the fully closed position 8a of the valve body 8 by formation of an air passage groove 5, as indicated in the lowering portion of characteristics of FIG. 10 given in FIG. 11.

This method provides the advantage of ensuring a sufficient volume of air required to start and operate the engine even if the valve body 8 has stuck immovable in this area.

The air passage groove 5 is formed in the area from the fully closed position 8a for control purposes to the downstream side (e.g. 8b). When there is no current supply to the motor 12, this arrangement allows the valve body 8 to be set to the default opening position inter-mediate opening), when the valve body 8 has been returned to the mechanically fully closed position 8b. This configuration has an advantage of reducing the number of mechanical parts of the default mechanism (i.e. no need of using a spring for energizing for the opening side).

In this case, the inlet taper 6 of the air passage groove 5 is not always necessary. The only thing required is to secure the opening area necessary for the mechanically fully closed position 8b of the valve body 8. This embodiment has the advantage of simplifying the profile of the air passage groove 5.

Similarly to the diesel engine throttle device, the area, profile, number and position of openings of the air passage groove 5 can be changed in response to the required default airflow. In FIGS. 9 and 10, it is possible to make the change of air flow constant or almost constant in the valve opening within the range of that spherical surface, by making a part of the air passage 2 in a spherical surface, similarly to the case of FIGS. 5 and 6.

The following describes the characteristics of the present embodiment. In the intake air throttle device of the diesel engine, the passage of the throttle valve control range is designed in a cylindrical form. A slight gap between the valve body in the aforementioned area and the passage surface can be reduced by formation of an air passage groove (e.g. a groove on the entire outer periphery of the throttle valve or a partial groove) downstream near the fully closed position of the throttle valve provided inside the air passage for control purposes. This arrangement allows accurate control of reducing the volume of intake air.

Adjustment of the area of the opening in the air passage groove makes it possible to supply the volume of air flow required for traveling of a car, even if the valve body has stuck near the mechanically fully closed position. Further, a taper is formed in such a way that the area of the air passage groove becomes constant in the area downstream from the fully closed position of the valve body for control purposes, whereby a predetermined volume of air can be supplied into the combustion chamber, even if positional variations have occurred to the valve body.

In an electronically controlled throttle valve device for gasoline engine, an air passage groove is formed in the passage within the range of valve body control. This arrangement allows the volume of air required for the traveling of a car (volume of air required at the prior art default opening position) to be supplied by the aforementioned passage groove, when the valve is returned to the mechanically fully closed position by the force of a return spring in cases where current is not supplied to the motor as a valve body driving device.

The throttle valve device of the present embodiment avoids sticking of the valve body without increasing the number of parts of a diesel engine. At the same time, it makes it possible to supply the volume of air required for traveling of a car, even when sticking has occurred downstream from the control area. Further, this arrangement permits a stable supply of airflow at the idle position of the valve body. In the gasoline engine, it is possible to provide the prior art functions by reduction in the number of parts used in the throttle device of the valve body driving device.

The present invention provides an air intake control device that supplies a required volume of air in a simple configuration in the event of a trouble, while maintaining the controllability of the volume of air.

The foregoing disclosure has been set forth merely to illustrate the invention and is not intended to be limiting. Because modifications of the disclosed embodiments incorporating the spirit and substance of the invention may occur to persons skilled in the art, the invention should be construed to include everything within the scope of the appended claims and equivalents thereof.

What is claimed is:

1. An air intake control device for a diesel engine comprising:
   a throttle valve installed in an air intake passage of the engine, wherein the throttle valve is rotatable over a throttle valve rotatable range between a throttle valve-fully open position which defines a maximum intake air volume and an endpoint position;
   a motor for controlling the throttle valve to control intake air in response to signals from a control unit;
   a return spring for exerting a spring force on the throttle valve toward the throttle valve-fully open position; and
   a bypass for supplying air downstream from the throttle valve by bypassing the throttle valve when the throttle valve is in said endpoint position,
   wherein the bypass is arranged so as to define a throttle valve-minimum intake air volume position between said throttle valve-fully open position and said endpoint position at which an opening area is smaller than an opening area at said endpoint position, said opening area at the endpoint position including an opening area of said bypass at the endpoint position.

2. An air intake control device for a diesel engine comprising:
   a throttle valve for controlling an opening area of an air intake passage, wherein the throttle valve is rotatable over a throttle valve rotatable range between a throttle valve-fully open position which defines a maximum intake air volume and an endpoint position;
   a motor for controlling the throttle valve to control intake air in response to signals from a control unit;
   a return spring for exerting a spring force on the throttle valve toward the throttle valve-fully open position; and
   a groove formed so as to straddle said endpoint on an interior wall of the air intake passage, thereby forming a path communicating between the upper reaches and the lower reaches of the intake passage when the throttle valve is in said endpoint position;
   wherein the groove is arranged so as to define a throttle valve-minimum intake air volume position between said throttle valve-fully open position and said endpoint position at which an opening area is smaller than an opening area at said endpoint position, said opening area at the endpoint position including an opening area of said groove at the endpoint position.

3. The air intake control device for an internal combustion engine according to claim 2, wherein the groove is formed in the air intake passage so as to increase the volume of air passing through the air intake passage as the throttle valve rotates toward said endpoint from said minimum intake air volume position.

4. The air intake control device for an internal combustion engine according to claim 2, wherein the groove is formed in the air intake passage so as to maintain a constant volume of air passing through the air intake passage as the throttle valve rotates toward said endpoint from said minimum intake air volume position.

5. The air intake control device for an internal combustion engine according to claim 2, wherein a part of the air intake passage is formed in a spherical form approximate to a rotary locus of an edge of the throttle valve.

6. The air intake control device for an internal combustion engine according to claim 3, wherein a part of the air intake passage is formed in a spherical form approximate to a rotary locus of an edge of the throttle valve.

7. The air intake control device for an internal combustion engine according to claim 4, wherein a part of the air intake passage is formed in a spherical form approximate a the rotary locus of an edge of the throttle valve.

8. The air intake control device for a diesel engine according to claim 1, wherein the bypass is formed as a groove along an inner surface of the throttle body forming the air intake passage.

9. The air intake control device for a diesel engine according to claim 2, wherein the groove is formed along an inner surface of a throttle body forming the air intake passage.

10. The air intake control device for a diesel engine according to claim 1, comprising a motor housing for the motor, which is integrated with a throttle body forming the intake passage,
   wherein a motor housing-inner surface part adjacent to the intake passage is flat, and
   an intake passage-inner surface part opposite to the flat inner surface of the motor housing is provided with a groove which forms the bypass.

11. The air intake control device for a diesel engine according to claim 2, comprising a motor housing for the motor, which is integrated with a throttle body forming the intake passage,
   wherein a motor housing-inner surface part adjacent to the intake passage is flat, and
   an intake passage-inner surface part opposite to the flat inner surface of the motor housing is provided with the groove.

* * * * *